J. W. NEAL & W. H. STARTZMAN.
WEIGHING APPARATUS.
No. 66,165. Patented June 25, 1867.
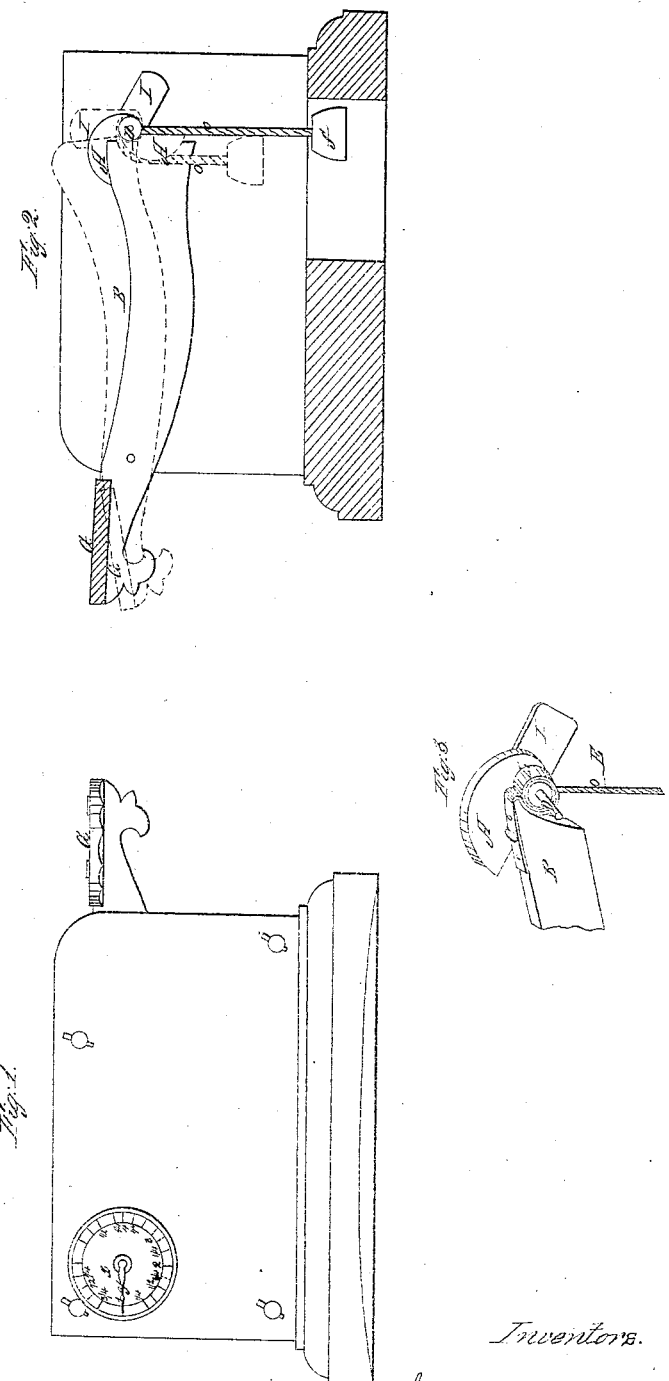

United States Patent Office.

JAMES W. NEAL AND WILLIAM H. STARTZMAN, OF BIG LICK, VIRGINIA, ASSIGNORS TO THEMSELVES AND HOWARD MUNNIKHUYSEN, OF BALTIMORE, MARYLAND, AND SAID STARTZMAN, ASSIGNOR TO SAID NEAL & MUNNIKHUYSEN.

*Letters Patent No. 66,165, dated June 25, 1867.*

IMPROVED WEIGHING APPARATUS.

The Schedule referred to in these Letters Patent and making part of the same.

TO ALL WHOM IT MAY CONCERN:

Be it known that we, JAMES W. NEAL and WILLIAM H. STARTZMAN, of Big Lick, in the county of Roanoke, and State of Virginia, have invented a new and improved mode of constructing Self-Indicating Balances; and we do hereby declare that the following is a full and exact description thereof, reference being had to the accompanying drawings, and to the letters of reference marked thereon.

The nature of our invention consists in the construction of self-indicating balances by applying the cam-lever A as operated on by a beam, B, connected by the belt or chain C to shaft of cam-lever, or operated by a pinion on shaft of cam-lever A and segment on end of beam B.

Figure 1 on the accompanying drawings is a side view of the machine when set up ready for use. G is a scoop or pan, upon which the articles to be weighed are placed, and X is a dial, accurately laid off and marked with figures representing pounds and fractions thereof. Y is an indicator or hand upon the end of a shaft, which is represented by the letter D, which hand Y, as the beam B is depressed, revolves upon the dial X, and points to the figures representing the weight of the article in the scoop.

Figure 2 is a view of the inside of the machine, that is, as it appears with one side of the enclosing case removed. It represents the machine in two positions: first, when the machine is at rest; and, secondly, when the beam is depressed. B is the beam upon which rests the scoop G. D is a shaft passing through from side to side. C is a band or belt, which connects the beam B to the shaft D, and which belt C winds around the shaft D as the beam is worked. A is a cam-lever upon the shaft D. E is a cord, which works in a groove which is cut in the periphery of the cam-lever A, and $f$ is a weight attached to the cord E, which will balance a weight in the scoop.

The operation, as will be seen by reference to the drawings, is this: By placing the article to be weighed in the scoop, which depresses the lever B, and that being connected to the shaft of the cam-lever A, causes the lever A to revolve and carry the weight further from the centre as the weight in the scoop is increased, and the indicator shows the weight upon the dial. As soon as the article is removed from the scoop, the balances recover their original position, the beam being acted upon by the weights on the lever.

What we claim as our invention, and desire to secure by Letters Patent, is—

The cam-lever A, cord E, and weight $f$, connected to the shaft D, when used in combination with the beam B and belt C, all the parts being arranged as specified.

J. W. NEAL,
WILLIAM H. STARTZMAN.

Witnesses:
P. S. T. TERRY,
A. PETTYJOHN.